(12) United States Patent
Ichikawa (10) Patent No.: US 9,798,420 B2
(45) Date of Patent: Oct. 24, 2017

(54) ELECTRONIC APPARATUS, CONTROL METHOD THEREFOR, AND STORAGE MEDIUM

(71) Applicant: CANON KABUSHIKI KAISHA, Tokyo (JP)

(72) Inventor: Sho Ichikawa, Ebina (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/167,546

(22) Filed: May 27, 2016

(65) Prior Publication Data

US 2016/0357345 A1 Dec. 8, 2016

(30) Foreign Application Priority Data

Jun. 3, 2015 (JP) ................. 2015-112814

(51) Int. Cl.
*G06F 3/041* (2006.01)
*G06F 3/044* (2006.01)

(52) U.S. Cl.
CPC ............ *G06F 3/0418* (2013.01); *G06F 3/044* (2013.01)

(58) Field of Classification Search
CPC ................................ G06F 3/0418; G06F 3/044
See application file for complete search history.

(56) References Cited

U.S. PATENT DOCUMENTS

| | | | | |
|---|---|---|---|---|
| 8,199,126 | B1* | 6/2012 | Taubman | G06F 3/011 345/156 |
| 9,104,282 | B2* | 8/2015 | Ichikawa | G06F 3/0416 |
| 9,244,565 | B2* | 1/2016 | Ichikawa | G06F 3/0416 |
| 2011/0018611 | A1* | 1/2011 | Newman, Jr. | G06F 3/03547 327/517 |
| 2011/0050620 | A1* | 3/2011 | Hristov | G06F 3/0416 345/174 |
| 2013/0050141 | A1* | 2/2013 | Park | G06F 3/0488 345/174 |
| 2013/0321335 | A1* | 12/2013 | Tokutake | G06F 3/044 345/174 |

FOREIGN PATENT DOCUMENTS

JP          10-20992 A        1/1998

* cited by examiner

*Primary Examiner* — Andrew Sasinowski
(74) *Attorney, Agent, or Firm* — Canon U.S.A., Inc. IP Division (57) ABSTRACT

An electronic apparatus includes a touch panel having a plurality of sensors each having capacitance changing in response to a touch operation performed thereon. In a case where a detected capacitance of one of a predetermined number of sensors from an outer side of a plurality of sensors exceeds detected capacitance of the other sensors, and a detected capacitance of a sensor adjacent in an inner side direction of the touch panel to the sensor with the detected capacitance exceeding the other sensors is smaller than a reference capacitance, position coordinates of a touch operation generating the detected capacitance are calculated toward an outer side direction from a center of gravity of detected capacitances generated by the touch operation from the plurality of sensors.

10 Claims, 11 Drawing Sheets

ELECTRONIC APPARATUS, CONTROL METHOD THEREFOR, AND STORAGE MEDIUM

BACKGROUND OF THE INVENTION

Field of the Invention

The present disclosure generally relates to electronics and, more particularly, to an electronic apparatus having a capacitive touch panel, a control method thereof, and a storage medium.

Description of the Related Art

In recent years, an increased number of electronic apparatuses such as a smart phone and a digital camera are available each having a touch panel by which a touch operation of a finger, for example, can be two-dimensionally detected. Various types of touch panel are available such as pressure sensitive, capacitive and optical touch panels and can determine the presence/absence of a touch input by comparing a touch sensor output value with a predetermined threshold value. If a touch input is present, the touch panel determines touch position coordinates from one or more touch sensor output values.

A capacitive touch panel detects a touch operation by comparing a capacitance value being a touch sensor output or an amount of change therein with a predetermined threshold value. The capacitance value varies in accordance with a touch area of a touch input. Normally, a touch position can be determined by using detected capacitance values from a plurality of adjacent sensors. However, because one of the adjacent sensors is not provided in an end of a sensor region of the touch panel, a touch operation including a touch off a sensor region if any may result in a calculated touch position coordinates different from actual coordinates of a touch position intended by a user, reducing the touch positional accuracy.

Against the problem, Japanese Patent Laid-Open No. 10-20992 discloses a technology including selecting, as an alternative to the other adjacent sensor, an end sensor in a side of an operating region opposite to a touched side of the sensor region and calculating the actual touch position coordinates.

The technology in the past disclosed in Japanese Patent Laid-Open No. 10-20992 may not achieve highly accurate calculation of a touch position for a touch at an end of a sensor region. A touch onto an end of a sensor region may exhibit a substantially constant sensor output value independent from how a user touches. Thus, the contribution ratio of the calculation of touch position coordinates is also independent from a small difference in end touch position between an end side, a center and an opposite end side on an end sensor, for example, and the same result can be obtained from the calculation of the touch position coordinates. In other words, the accuracy reflecting a difference in touched position may not be achieved.

SUMMARY OF THE INVENTION

The present disclosure provides an electronic apparatus, a control method thereof, and a storage medium.

An aspect of the present disclosure provides an electronic apparatus including a touch panel having a plurality of sensors each having capacitance changing in response to a touch operation performed thereon, and a calculating unit configured to, in a case where a detected capacitance of one of a predetermined number of sensors from an outer side of a plurality of sensors exceeds detected capacitance of the other sensors, and a detected capacitance of a sensor adjacent in an inner side direction of the touch panel to the sensor with the detected capacitance exceeding the other sensors is smaller than a reference capacitance, calculate position coordinates of a touch operation generating the detected capacitance toward an outer side direction from a center of gravity of detected capacitances from the plurality of sensors generated by the touch operation.

Further features of the present disclosure will become apparent from the following description of exemplary embodiments with reference to the attached drawings.

DESCRIPTION OF THE EMBODIMENTS

Exemplary embodiments of the present disclosure will be described in detail below with reference to drawings.

First Exemplary Embodiment

Figure 1:
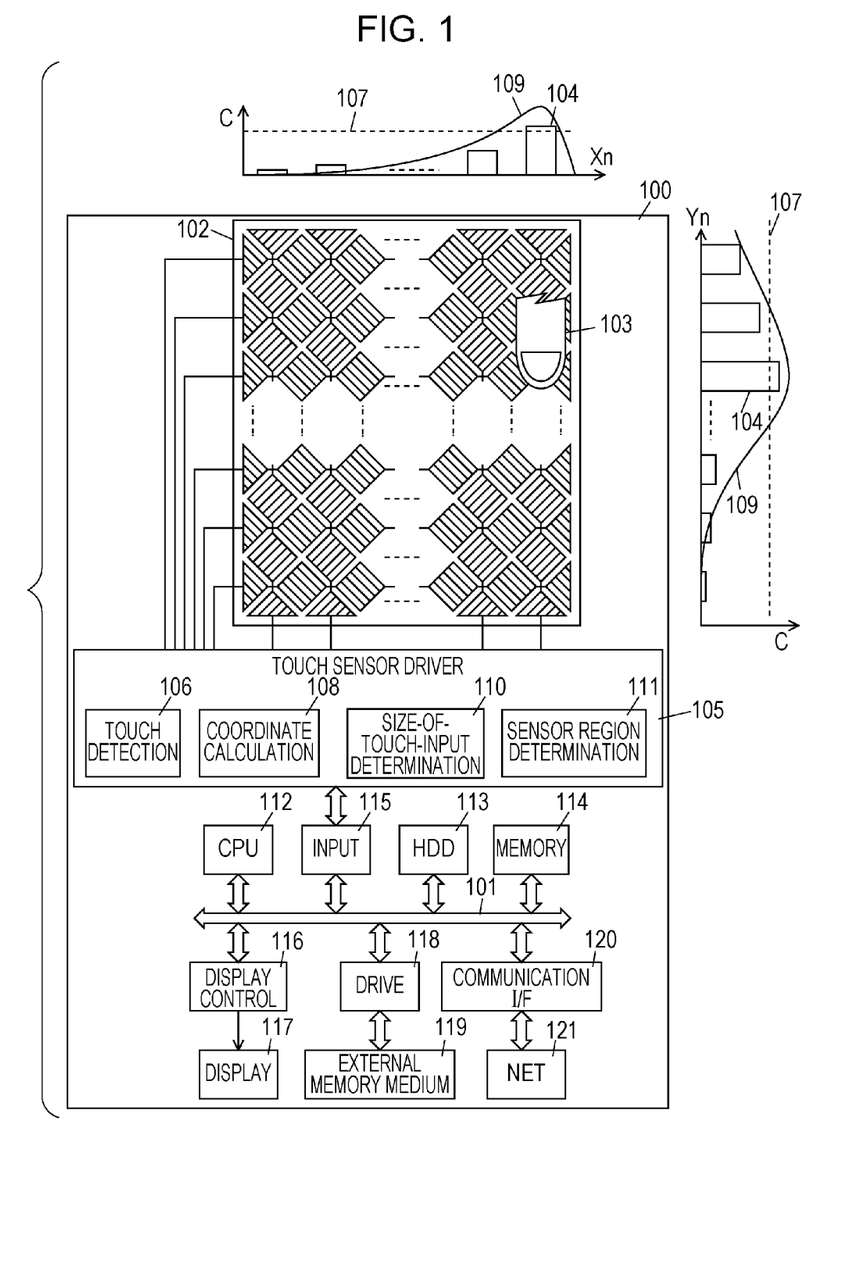
FIG. 1 is a schematic configuration block diagram illustrating a first exemplary embodiment of the present disclosure.

FIG. 1 illustrates a schematic configuration block diagram of an electronic apparatus equipped with an exemplary embodiment of a capacitive touch panel according to the present disclosure.

Referring to FIG. 1, an electronic apparatus 100 includes a central processing unit (CPU) 112, which may include one or more processors, a hard disk (HD) 113, a memory 114, an input unit 115, a display control unit 116, a drive device 118, and a communication interface (I/F) 120, all of which are connected to an internal bus 101. The components connected to the internal bus 101 are configured to be capable of exchanging data with each other via the internal bus 101. As used herein, the term "unit" generally refers to any combination of software, firmware, hardware, or other component, such as circuitry, that is used to effectuate a purpose.

A capacitive touch panel 102 is an apparatus (operating member) configured to generate a capacitance 104 with an electric conductor 103 such as a finger or a stylus pen in response to an approach within a predetermined distance or a touch operation of the electric conductor 103 and detects a two-dimensional position of the touch operation.

A touch sensor drive circuit 105 includes a touch detecting unit 106, a coordinate calculating unit 108, a size-of-touch-input determining unit 110, and a sensor region determining unit 111. The touch detecting unit 106 is configured to detect the presence/absence of a touch operation by comparing a capacitance 104 generated with the electric conductor 103 with a touch detected threshold value 107. The touch detected threshold value 107 is a variable to be set in accordance with a calibration of the capacitive touch panel 102. The capacitive touch panel 102 may also detect a capacitance in a case where the electric conductor 103 such as a finger or a stylus pen is not approaching thereto in some ambient environment or a change over years. Therefore, the capacitive touch panel 102 may often perform a calibration process upon start-up or every predetermined time period, and the capacitance generated when the electric conductor 103 such as a finger or a stylus pen may be set as a reference value. The touch detected threshold value 107 is set with respect to the reference value depending on the calibration. In other words, the touch detected threshold value 107 is a threshold value for an amount of change (from the reference value) in detected capacitance. Threshold values relating to capacitance are also threshold values for amounts of change in detected capacitance. Reference values relating to capacitance are also set in accordance with a calibration. Notably, threshold values such as the touch detected threshold value 107 may be a fixed capacitance value, instead of a threshold value for the amount of change from a reference value. The coordinate calculating unit 108 may calculate a center of gravity 109, for example, from a capacitance 104 detected from a sensor (electrode) and thus calculate touch position coordinates. More specifically, weights $p_1$ to $p_m$ are set for generated capacitances $c_1$ to $c_m$ (where m is the number of sensors on one axis) of the touch panel 102 when touched and calculate the center of gravity 109 with the set weights as in the following expression (1).

$$\frac{c_1 \cdot p_1 + c_2 \cdot p_2 + \cdots + c_m \cdot p_m}{c_1 + c_2 + \cdots + c_m} \quad (1)$$

In a case where sensors (or electrodes) are arranged two or more dimensionally on the touch panel 102, the coordinate calculating unit 108 calculates the center of gravity 109 separately for each axis. The size-of-touch-input determining unit 110 determines the size of the electric conductor 103 from a distribution of detected capacitances 104 on the touch panel 102. The sensor region determining unit 111 determines whether a touch position is in an end portion of a sensor region of the touch panel 102 or not from outputs from the coordinate calculating unit 108 and the size-of-touch-input determining unit 110.

The hard disk 113 may store image data and other data and programs to be used for operations to be performed by the CPU 112. The memory 114 includes a random access memory (RAM), for example. The CPU 112 may control the components of the electronic apparatus 100 in accordance with a program stored in a hard disk 113 and by using the memory 114 as a working memory, for example. A program for an operation of the CPU 112 may be pre-stored in a read only memory (ROM), not illustrated, for example, without limiting to being stored in the hard disk 113.

The input unit 115 receives a touch operation performed by a user on the touch panel 102 and supplies a control signal indicative of a detail (such as a touch position of the operation) to the CPU 112. The CPU 112 controls the components of the electronic apparatus 100 in accordance with a program based on a control signal generated in the input unit 115 in accordance with a user operation performed on the touch panel 102. Thus, the electronic apparatus 100 exhibits a function corresponding to the user operation.

The display control unit 116 outputs a display signal for displaying an image to a display device 117. The CPU 112 supplies a display control signal generated in accordance with a program to the display control unit 116. The display control unit 116 generates a display signal based on a display control signal from the CPU 112 and supplies the display signal to the display device 117. For example, the display control unit 116 causes the display device 117 a graphical user interface (GUI) screen included in a GUI based on a display control signal generated by the CPU 112.

In general, the touch panel 102 is provided integrally over the display plane of the display device 117. For example, the touch panel 102 has a luminous transmittance enough for not disturbing the display functionality of the display device 117 and is attached on an upper layer of the display plane of the display device 117. Input coordinates on the touch panel 102 are associated with display coordinates on the display device 117. Thus, a user can input various instructions to the CPU 112 as if he or she is directly operating an object at an arbitrary position on a screen displayed on the display device 117.

An external storage medium 119 such as a compact disc (CD) (registered trademark) or a digital versatile disc (DVD) (registered trademark) is installable in the drive device 118, and data can be read from and write to the installed external storage medium 119 under control of the CPU 112. The external storage medium 119 may be a medium including a non-volatile semiconductor memory such as a memory card.

The communication I/F 120 is communicably coupled with a network 121 such as a local area network (LAN) and the Internet under control of the CPU 112.

All or one of functions of the touch detecting unit 106, coordinate calculating unit 108, size-of-touch-input determining unit 110 and sensor region determining unit 111 in the touch sensor drive circuit 105 may be incorporated into the CPU 112. For easy understanding of operations to be performed by the electronic apparatus 100, the following descriptions assume that the CPU 112 implements the functions of the touch detecting unit 106, coordinate calculating unit 108, size-of-touch-input determining unit 110 and sensor region determining unit 111.

Hereinafter, operations to be performed on the touch panel 102 will be called as follows. That is, touching the touch panel 102 with a finger or a pen will be called "touch-down" (Touch-Down) below. A state in which the touch panel 102 is being touched by a finger or a pen is called "touch on" (Touch-On). Moving a finger or a pen touching the touch panel 102 will be called "touch-move" (Touch-Move) below. Separating the finger or pen from the touch panel 102 will be called "touch-up" (Touch-Up). A state in which nothing is touching the touch panel 102 will be called "touch off" (Touch-Off).

Performing touch-down, touch-move and touch-up on the touch panel 102 is expressed as drawing a stroke. An operation for quickly drawing a stroke will be called a flick. A flick refers to an operation for quickly moving a finger on the touch panel 102 by a certain distance and releasing, that is, an operation for quickly tracing the touch panel 102 with a finger like snapping.

The input unit 115 notifies an operation as described above and position coordinates touched with a finger or a pen on the touch panel 102 to the CPU 112 via the internal bus 101. The CPU 112 determines whether what kind of operation has been performed on the touch panel 102 based on information as described above from the input unit 115. In other words, the CPU 112 (or the input unit 115 and the CPU 112) can detect and determine the operation performed on the touch panel 102. When a move is performed, the CPU 112 can determine a vertical component and a horizontal component on the capacitive touch panel 102 of the moving direction of a finger or a pen moving on the capacitive touch panel 102 based on a change in position coordinates. When a move by a predetermined distance or more at a speed equal to or higher than predetermined speed followed by a touch-up is detected, the CPU 112 determines that a flick has been performed. When a move by a predetermined distance or more at a speed lower than the predetermined speed is detected, the CPU 112 determines that a drag has been performed.

According to this exemplary embodiment, whether a detected capacitance of an adjacent sensor (electrode) to an end sensor (electrode) when an end touch occurs is equal to or higher than a reference capacitance or not is determined, and touch position coordinates are calculated in consideration of the determination result so that the touch positional accuracy upon end touch can be improved.

Figure 2A:
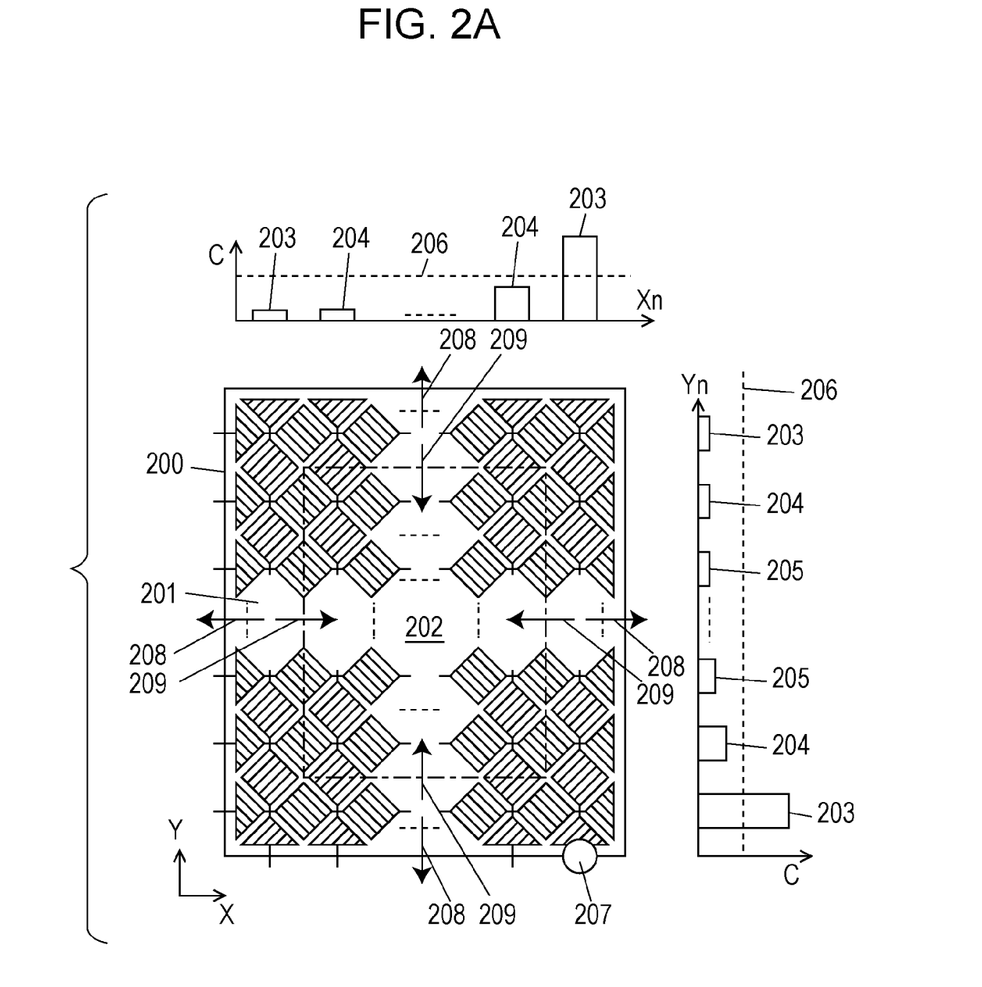
FIG. 2A illustrates a first correspondence example between a touch position on a capacitive touch panel and a detected capacitance.
Figure 2B:
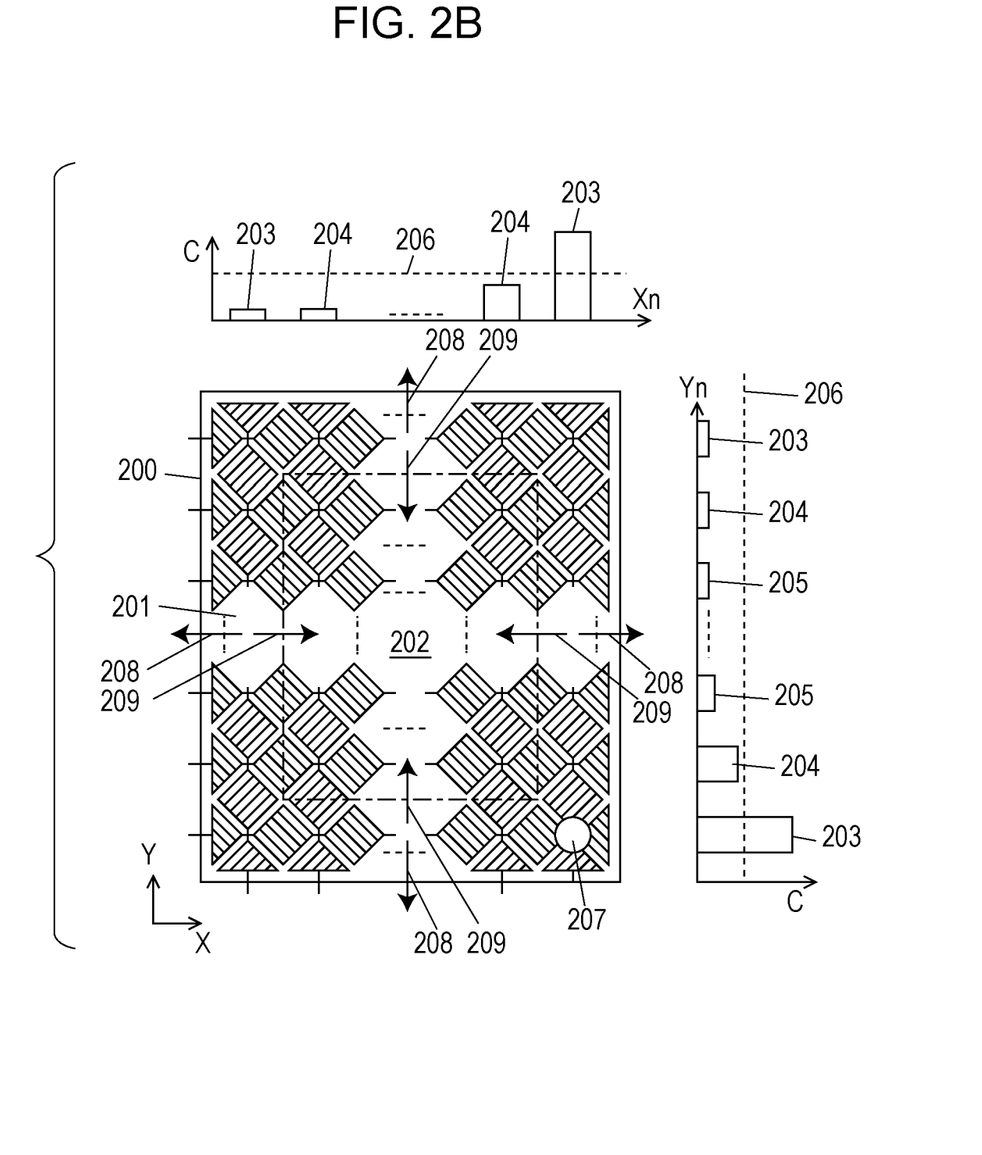
FIG. 2B illustrates a second correspondence example between a touch position on a capacitive touch panel and a detected capacitance.
Figure 2C:
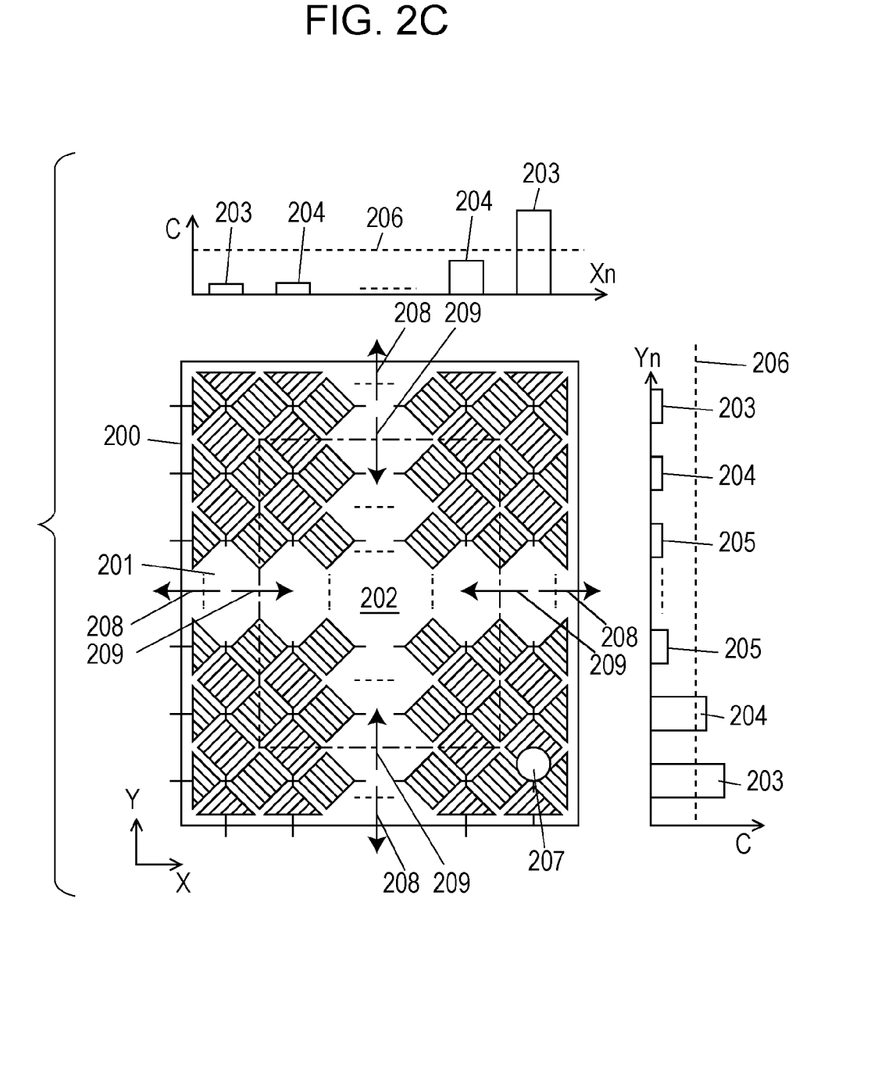
FIG. 2C illustrates a third correspondence example between a touch position on a capacitive touch panel and a detected capacitance.

FIGS. 2A, 2B and 2C illustrate sensor (electrode) layout examples on the touch panel 102 and relationship examples between touch positions and detected capacitances. FIGS. 2A, 2B and 2C illustrate a sensor region 200 in which a touch is detectable on the touch panel 102. The sensor region 200 has a plurality of touch sensors included in the touch panel 102 two-dimensionally arranged vertically and horizontally. A plurality of line sensors (X sensors) each having a plurality of sensors linearly in an X direction (horizontal direction in FIGS. 2A to 2C) is located in parallel with a Y direction. Also, a plurality of line sensors (Y sensors) each having a plurality of sensors linearly in the Y direction (vertical direction in FIGS. 2A to 2C) is located in parallel with the X direction. The X sensors and the Y sensors are arranged in a crossing pattern such that the X sensors and the Y sensors do not overlap each other.

The sensor region 200 is operationally divided into a peripheral end region 201 where a sufficient touch area of a finger, for example, may not easily be obtained and a central region 202, excluding the end region 201, in which a sufficient touch area can be obtained. Referring to FIGS. 2A, 2B and 2C, the end region 201 has a width equivalent to one sensor from an outer edge of the sensor region 200. It should be noted that the width is not limited to the width equivalent to one sensor, but the end region 201 may be a region in which a predetermined number of sensors (electrodes) are arranged from an outer edge of the sensor region 200.

A capacitance 203 indicates a capacitance value detected by sensors in the end region 201. A capacitance 204 indicates a capacitance value detected by a sensor adjacent to the end region 201 in the central region 202. A capacitance 205 indicates a capacitance value detected by a sensor at a position far away from the end region 201 in the central region 202.

A reference capacitance (or threshold value) 206 is a reference value (threshold value for amounts of change) for determining whether a touch position is present on an end side (closer to the outer edge of the sensor region 200 or in an outer edge direction) or on the opposite end side (closer to an inner part of the sensor region 200 or in an inner part direction). The CPU 112 sets the reference capacitance 206 in the touch sensor drive circuit 105 for each touch panel. For example, the reference capacitance 206 is determined in consideration of the capacitance value 204 detected by a sensor adjacent to the end region 201 in the central region 202 when a touch occurs in a central part of the end region 201.

FIGS. 2A, 2B and 2C illustrate a touch plane 207 with respect to the touch panel 102 of a stylus pen or a finger of a user (or other electric conductors) for operating the touch panel 102. In FIG. 2A, a finger of a user positions on a boundary between the sensor region 200 and the outside thereof. In other words, a half of the touch plane 207 positions on a Y sensor in the end region 201, and the other half positions outside of the sensor region 200, that is, outside of the end region 201. In FIG. 2B, the whole touch plane 207 is contained in the end region 201. In FIG. 2C, the whole touch plane 207 positions in the end region 201 and is further contained in an inner part in the Y direction of the inside sensor region 200.

An end side 208 refers to a direction in which an adjacent sensor does not exist in the end region 201, and an opposite end side 209 refers to a direction in which an adjacent sensor exists in the end region 201. In other words, an input touch on the end side 208 corresponds to a touch closer to an outer side of the sensor region 200 among touch inputs to the end region 201, and an input touch on the opposite end side 209 corresponds to a touch on the opposite side (closer to the inner side of the sensor region 200) of the end side 208. When the sensors are arranged in two or more dimensionally on the capacitive touch panel 102, the end side 208 and the opposite end side 209 are defined for each axis.

Figure 3:
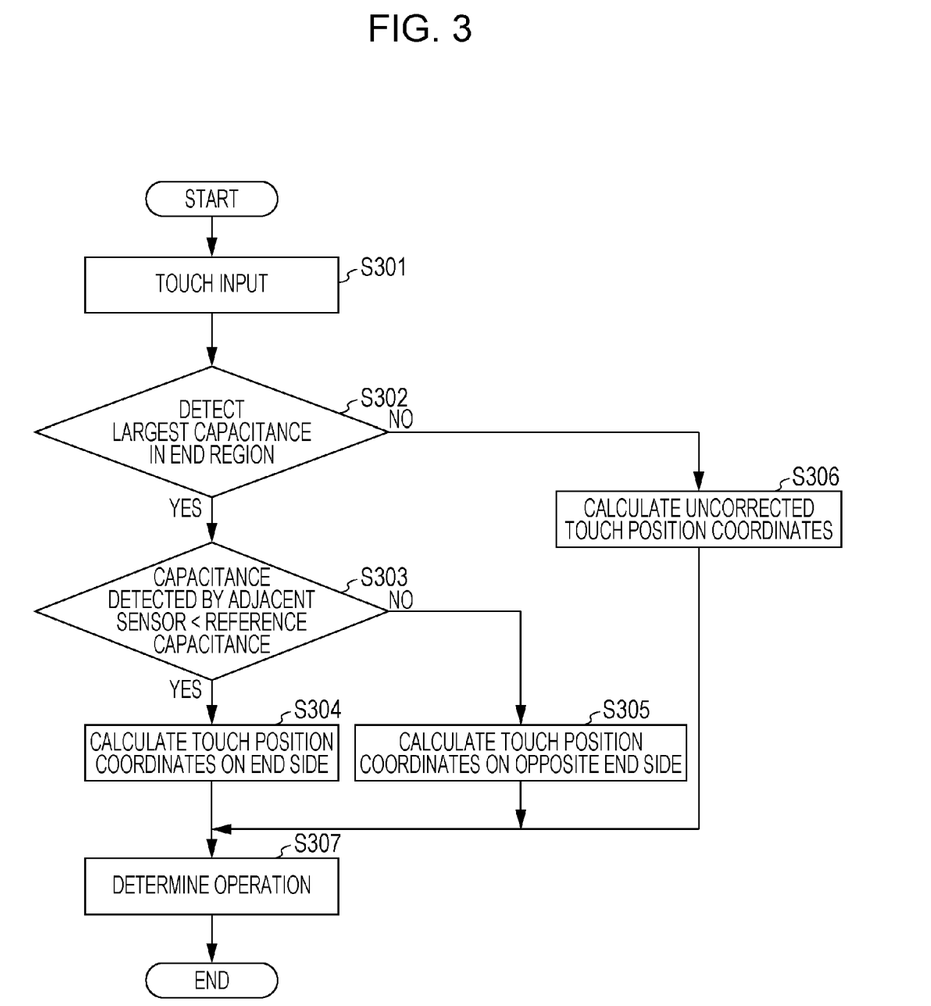
FIG. 3 is a flowchart for calculating touch position coordinates according to the first exemplary embodiment of the present disclosure.

FIG. 3 is a flowchart for touch detection control processing which may improve the touch positional accuracy when an end touch occurs according to this exemplary embodiment. The processing described in the flowchart may be implemented by decompressing a control program stored in the hard disk 113 into the memory 114 and executing the control program by the CPU 112.

In step S301, the CPU 112 detects a touch input performed by a user. The processing them moves to step S302.

In step S302, the CPU 112 determines whether the touch input is performed on the end region 201 or not. If the detected capacitance 203 in the end region 201 exhibits a highest detected capacitance of detected values, the CPU 112 determines that the touch has been performed on a sensor (end sensor) in the end region 201. The processing then moves to step S303. If the detected capacitance 203 of the end region 201 is not the highest, the CPU 112 determines that the touch has not been performed on an end sensor. The processing then moves to step S306.

In step S303, the CPU 112 examines whether the adjacent detected capacitance 204 (detected capacitance of the adjacent sensor) to the detected capacitance 203 is smaller than the reference capacitance 206 or not. If the detected capacitance 204 is smaller than the reference capacitance 206, the CPU 112 determines that the touch has been performed on the end side 208 of the end region 201. The processing then moves to step S304. If the detected capacitance 204 is equal to or higher than the reference capacitance 206, the CPU 112 determines that the touch has been performed on the opposite end side 209 of the end region 201. The processing then moves to step S305.

In step S304, the CPU 112 calculates the touch position coordinates corresponding to a position at outer side (end side 208) of the touch panel 102 than the normal center of gravity (as acquired by Expression (1)). For example, in Expression (1), $c_1$ is a detected capacitance of a sensor exhibiting a highest detected capacitance in the end region 201, $p_1$ is the weight of the sensor, and $c_2$ is a detected capacitance of an adjacent sensor to a sensor exhibiting a highest detected capacitance in the end region 201. The weight $p_1$ is corrected to $p_1'$, and the center of gravity 109 is calculated with $p_1'$ as in Expressions (2) and (3).

$$\frac{c_1 \cdot p_1' + c_2 \cdot p_2 + \cdots + c_m \cdot p_m}{c_1 + c_2 + \cdots + c_m} \qquad (2)$$

$$p_1' = p_1 \times b/c_2 \qquad (3)$$

where b is the reference capacitance 206. After the touch position coordinates are calculated, the CPU 112 proceeds to step S307.

In step S305, the CPU 112 calculates touch position coordinates toward the inner side (opposite end side 209) of the touch panel 102 from the normal center of gravity (as acquired by Expression (1)). More specifically, like step S304, Expressions (2) and (3) are used to calculate the touch position coordinates. After the touch position coordinates are calculated, the CPU 112 proceeds to step S307.

In step S306, the CPU 112 uses a highest detected capacitance value and surrounding detected capacitance values to calculate touch position coordinates. More specifically, the normal center of gravity using Expression (1) is used to calculate touch position coordinates.

In step S307, the CPU 112 executes a process corresponding to the calculated touch position. For example, when the position of an icon displayed on the display device 117 is touched, a function assigned to the touched icon is executed. In accordance with a move (touch-move) at a touch position, a display object may be scrolled, or the size of the display object may be enlarged or reduced.

Under control illustrated in FIG. 3, balanced and even touch positional accuracy can be provided for all of the touch sensor region. Having described that the width of the end region 201 corresponds to one surrounding sensor, an embodiment of the present disclosure is not limited thereto. The end region 201 may have an arbitrary width. Having described that the reference capacitance 206 is determined based on a detected capacitance value exhibited when a touch occurs in a central part of the end region 201, the reference capacitance 206 may be determined by other methods. Having described that the correction amount of weight is calculated from the detected capacitance 204 of an adjacent sensor and the reference capacitance 206, an embodiment of the present disclosure is not limited thereto. Such a correction amount of weight may be calculated by an arbitrary method. Having described that touch position coordinates are corrected by correcting the weight to be used in the weight calculation for calculating the center of gravity 109, other calculation methods or a correction thereof may be applied. As described above, a normal center of gravity is calculated as touch position coordinates in S306, and a touch position is corrected to an outer side (end side) and an inner side (opposite end side) in S304 and S305, respectively. However, an embodiment of the present disclosure is not limited thereto. Touch coordinates may be calculated under a predetermined condition different from the center of gravity in S5306, and the touch position may be corrected to an outer side (end side) and an inner side (opposite end side) from the touch coordinates acquired under the predetermined condition in S304 and S305, respectively.

Second Exemplary Embodiment

A second exemplary embodiment for calculating touch position coordinates by using a capacitance (virtual capacitance) of a virtual sensor will be described.

Figure 4:
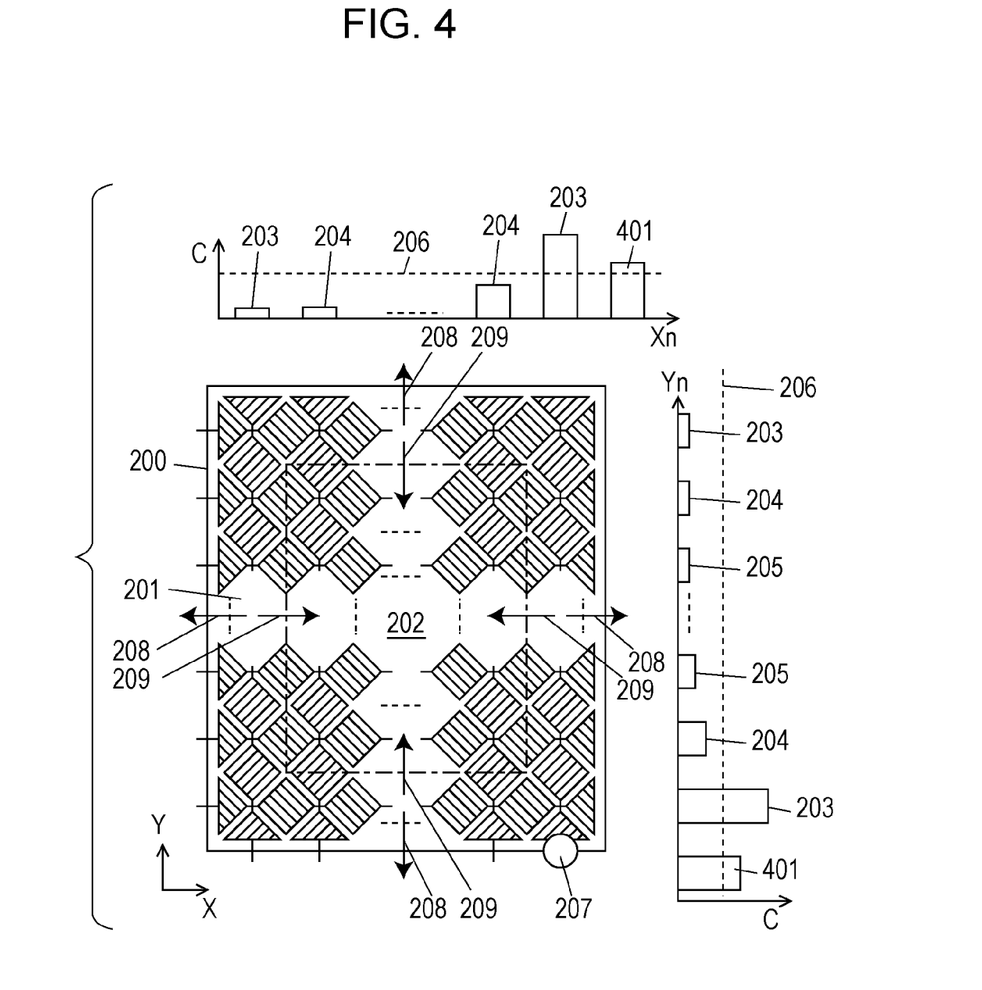
FIG. 4 is an explanatory diagram describing a virtual sensor and a capacitance thereof according to a second exemplary embodiment of the present disclosure.

FIG. 4 illustrates a schematic diagram illustrating a relationship example between touch position and detected capacitance according to the second exemplary embodiment and further illustrating virtual capacitance of a virtual sensor. A virtual sensor is virtually provided outside of the sensor region 200 for calculating a touch position in a case where a touch input occurs on the end side 208 of the end region 201. FIG. 4 illustrates a capacitance (virtual capacitance) 401 of a virtual sensor. The virtual capacitance 401 can be calculated from the detected capacitance 204 of an adjacent sensor and the reference capacitance 206 based on Expression (4).

$$k = 2b - a \qquad (4)$$

where k is the virtual capacitance 401 of the virtual sensor, a is the detected capacitance 204 of the adjacent sensor, and b is the reference capacitance 206.

Figure 5:
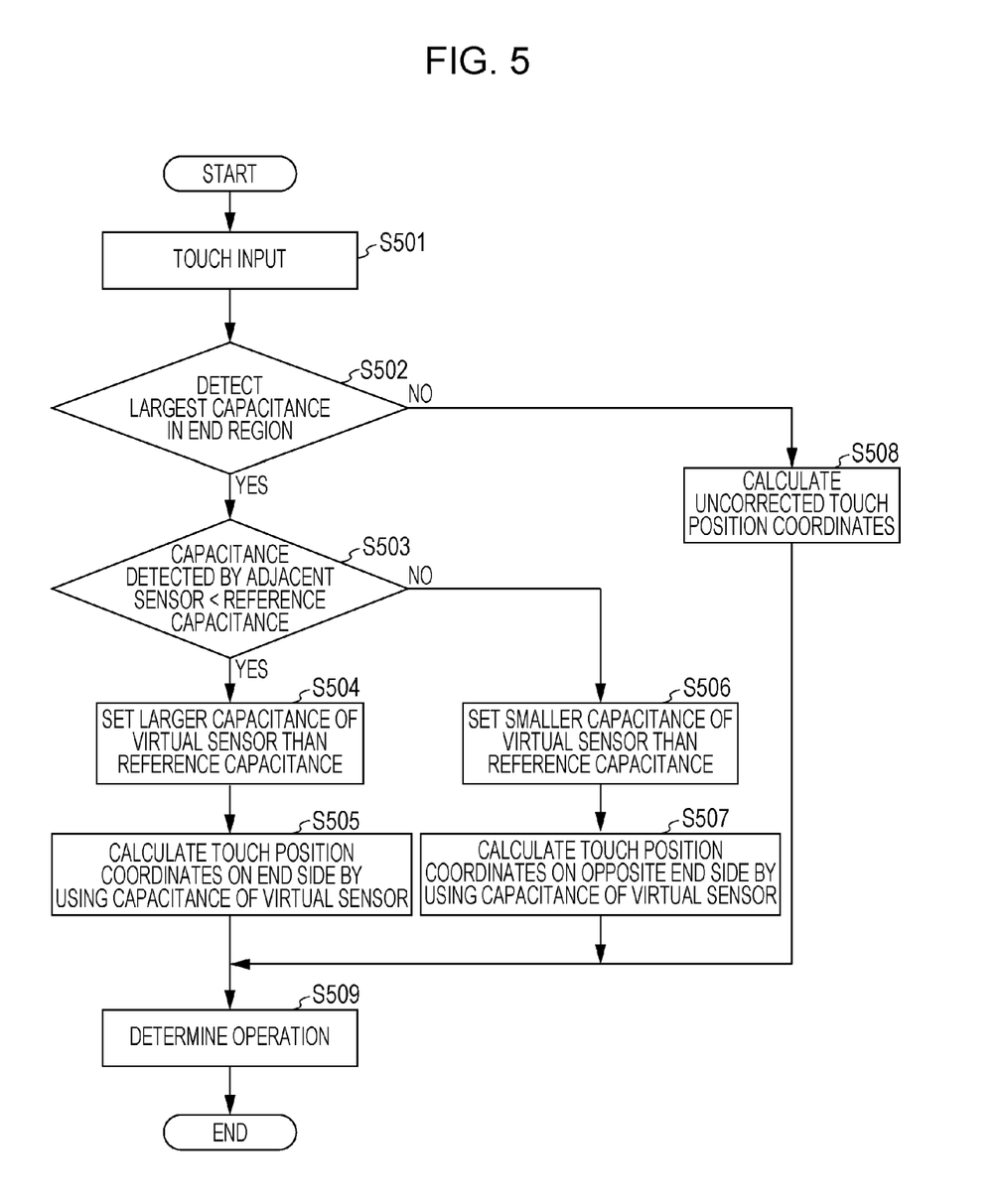
FIG. 5 is a flowchart for calculating touch position coordinates using a virtual sensor.

FIG. 5 is a flowchart for touch detection control according to the second exemplary embodiment. The processing in the flowchart illustrated in FIG. 5 is implemented by decompressing a control program stored in the hard disk 113 into the memory 114 and executing the control program by the CPU 112.

Because the processing in steps S501 to S503 and S508 to S509 in FIG. 5 is the same as the processing in steps S301 to S303 and S306 to S307 in FIG. 3, the description will be omitted.

If the detected capacitance [a] of the adjacent sensor is smaller than the reference capacitance 206 [b] (S503), the CPU 112 sets the capacitance 401 of the virtual sensor is set larger than the reference capacitance 206 in step S504. The virtual capacitance 401 is calculated in consideration of a difference between the detected capacitance 204 [a] of the adjacent sensor and the reference capacitance 206 [b] in Expression (4), for example. That is, $$k' = (b/a)(2b - a) \qquad (5)$$

where k' is the virtual capacitance 401 in consideration of a difference between the detected capacitance 204 of the adjacent sensor and the reference capacitance 206. After setting the capacitance 401 of the virtual sensor larger than the reference capacitance 206 [b], the CPU 112 proceeds to step S505. In step S505, the CPU 112 calculates touch position coordinates corrected toward the end side 208 from the normal center of gravity in consideration of the capacitance 401 [k'] of the virtual sensor set in step S504. For example, the capacitance 401 of the virtual sensor may be defined as $c_0$ (=k') and the weight may be defined as $p_0$ to be added to Expression (1) so that the center of gravity 109 can be calculated by using Expression (6).

$$\frac{c_0 \cdot p_0 + c_1 \cdot p_1 + c_2 \cdot p_2 + \cdots + c_m \cdot p_m}{c_0 + c_1 + c_2 + \cdots + c_m} \quad (6)$$

After calculating the touch position coordinates, the CPU 112 proceeds to step S509.

If the detected capacitance 204 of the adjacent sensor is equal to or larger than the reference capacitance 206 (S503), the CPU 112 sets the capacitance 401 of the virtual sensor smaller than the reference capacitance 206 in step S506. More specifically, the virtual capacitance 401 is calculated by using Expression (5) as in step S504. After setting the capacitance 401 of the virtual sensor smaller than the reference capacitance 206, the CPU 112 proceeds to step S507. In step S507, the CPU 112 applies the virtual capacitance 401 of the virtual sensor set in step S506 to Expression (6) as in step S505 to calculate touch position coordinates corrected toward the opposite end side 209. After calculating the touch position coordinates, the CPU 112 proceeds to step S509.

The control operation as illustrated in FIG. 5 can also provide balanced and even touch positional accuracy to the entire sensor region of the capacitive touch panel. Having described that the virtual capacitance 401 of the virtual sensor and a correction amount therefor are calculated from the detected capacitance 204 of an adjacent sensor and the reference capacitance 206, an embodiment of the present disclosure is not limited thereto. Such a correction amount of weight may be calculated by an arbitrary method. Having described that touch position coordinates are corrected by performing the weight calculation for calculating the center of gravity 109 in consideration of the virtual capacitance 401 of the virtual sensor, other calculation methods or a correction thereof may be applied.

Third Exemplary Embodiment

A third exemplary embodiment will be described in which a boundary between an end region and a central region of a sensor region is changed in accordance with the size of a touch input. This is for addressing individual differences in size of a finger and how to touch so that highly accurate determination of touch position coordinates suitable for individual users can be achieved.

Figure 6A:
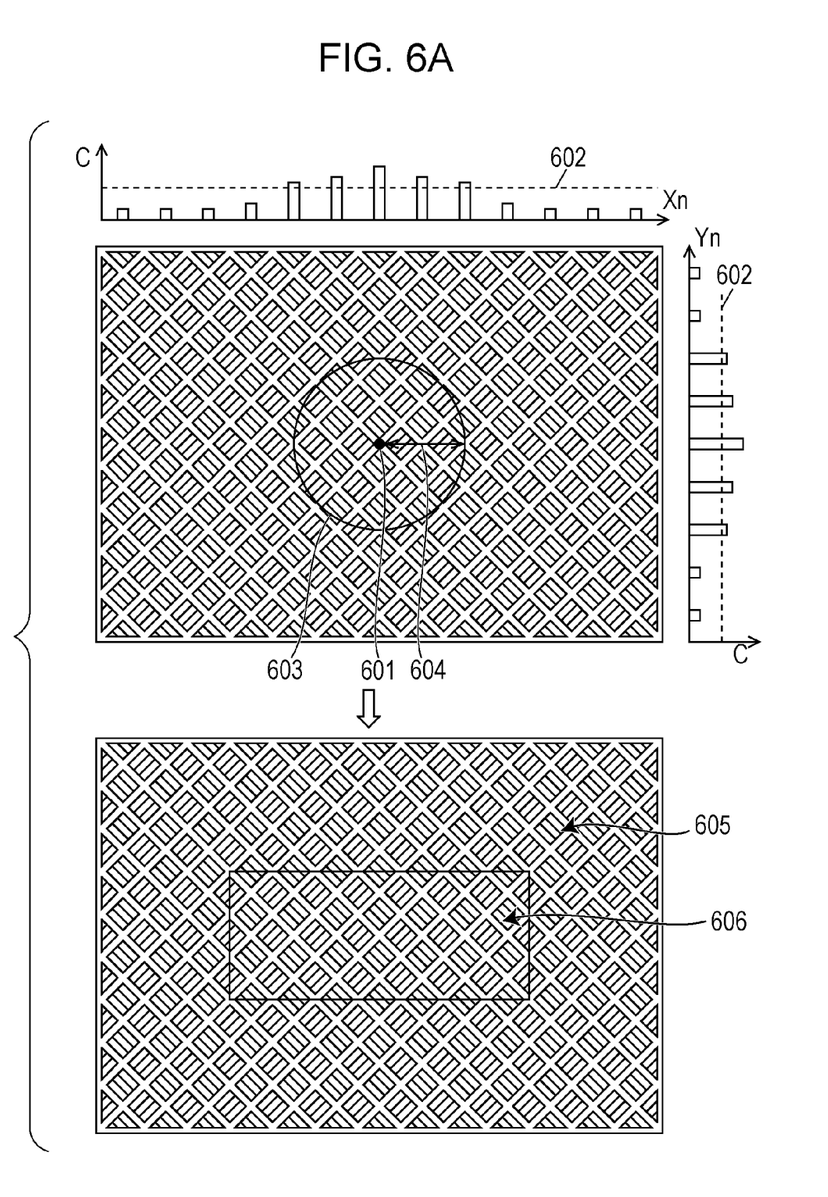
FIG. 6A is a schematic diagram illustrating a first relationship example between the size of a touch input and the size of an end region according to a third exemplary embodiment.
Figure 6B:
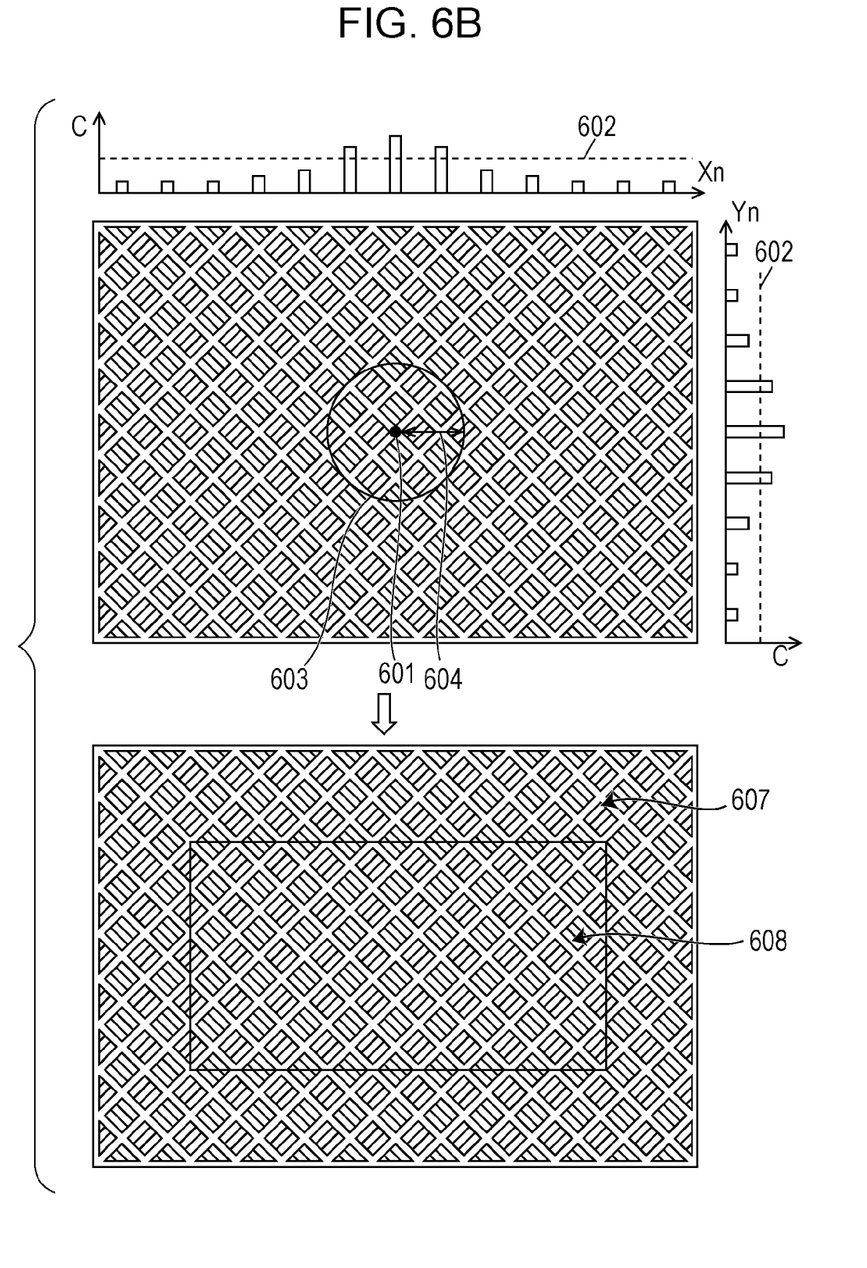
FIG. 6B is a schematic diagram illustrating a second relationship example between the size of a touch input and the size of an end region according to the third exemplary embodiment.
Figure 6C:
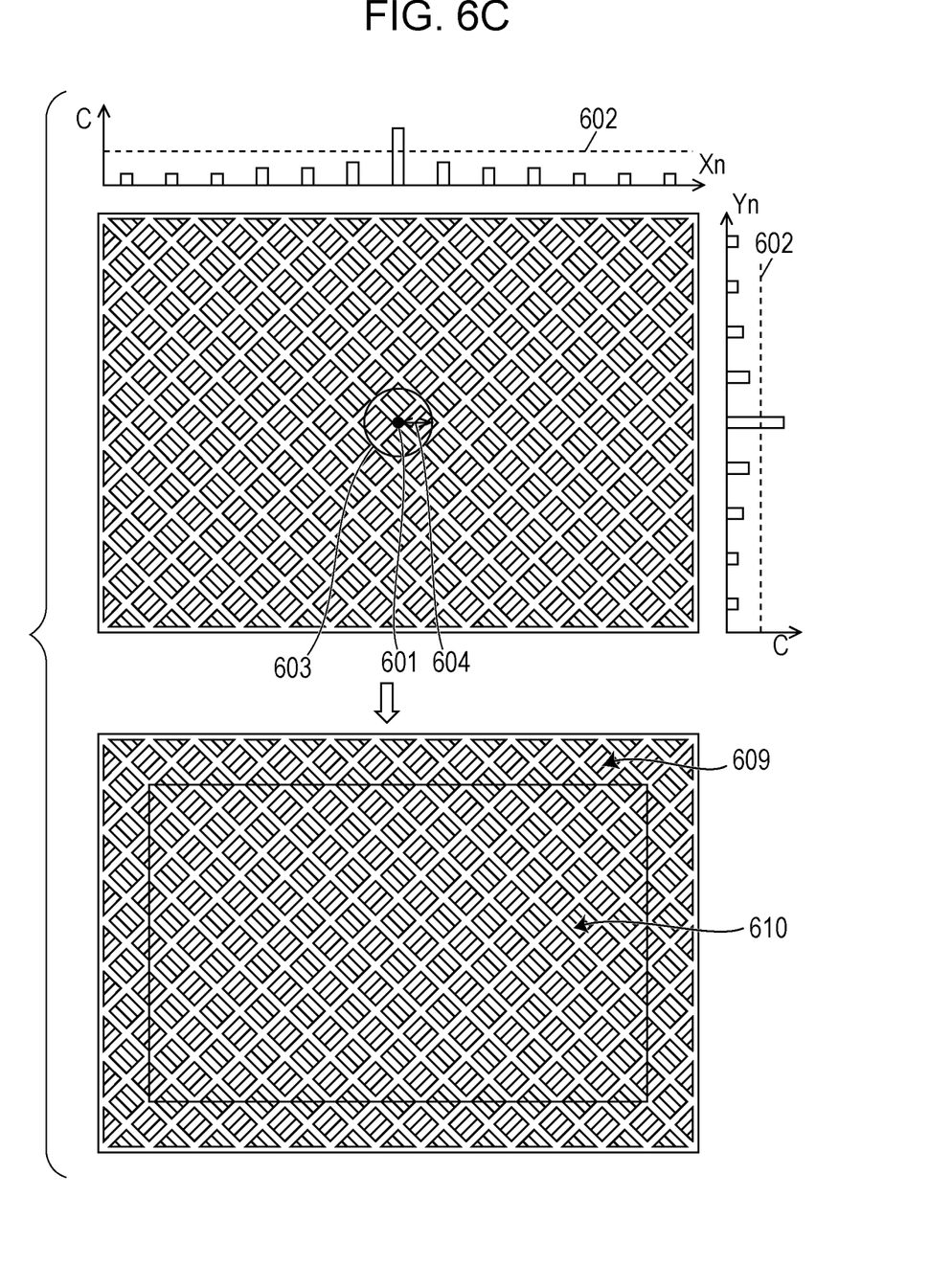
FIG. 6C is a schematic diagram illustrating a third relationship example between the size of a touch input and the size of an end region according to the third exemplary embodiment.

FIGS. 6A, 6B and 6C exemplarily illustrate relationships between touch position and detected capacitance on the touch panel 102 and examples of changes of a boundary between an end region and a central region.

A point 601 refers to a target point at which a touch input is performed for determining the size of the touch input. A determination capacitance 602 is a threshold value for determining the size of a touch input to the capacitance 104. The size-of-touch-input determining unit 110 determines the size of an touch input based on the number of sensors having capacitances equal to or higher than the determination capacitance 602 on the touch panel 102 when the touch input to the point 601 occurs.

FIGS. 6A to 6C illustrate a touch input 603 (or touch area of the touch input to the touch panel 102) to the point 601 where the size of the touch input 603 varies in accordance with the size of a user's finger and how to touch. A touch input radius 604 is a radius of the touch input 603.

A determination end region 605 (FIG. 6A) is a peripheral region having a width equivalent to three sensors of the sensor region 200. In the determination end region 605, the CPU 112 determines that there is a high possibility that a sufficient touch area may not be obtained on the touch panel 102. For example, the determination end region 605 may be set as an end region where the touch input radius 604 is equivalent to three sensors. A part excluding the determination end region 605 from the sensor region 200 is a central region called a determination central region 606.

A determination end region 607 (FIG. 6B) is a peripheral region having a width equivalent to two sensors of the sensor region 200. In the determination end region 607, the CPU 112 determines that there is a high possibility that a sufficient touch area may not be obtained on the touch panel 102. For example, the determination end region 607 is set as an end region where the touch input radius 604 is equivalent to two sensors. A part excluding the determination end region 607 from the sensor region 200 is a central region called a determination central region 608.

A determination end region 609 (FIG. 6C) is a peripheral region having a sensor equivalent to one sensor of the sensor region 200. In the determination end region 609, the CPU 112 determines that there is a high possibility that a sufficient touch area may not be obtained on the touch panel 102. For example, the determination end region 607 may be set as an end region where the touch input radius 604 is equivalent to one sensor. A part excluding the determination end region 609 from the sensor region 200 is a central region called a determination central region 610.

Figure 7:
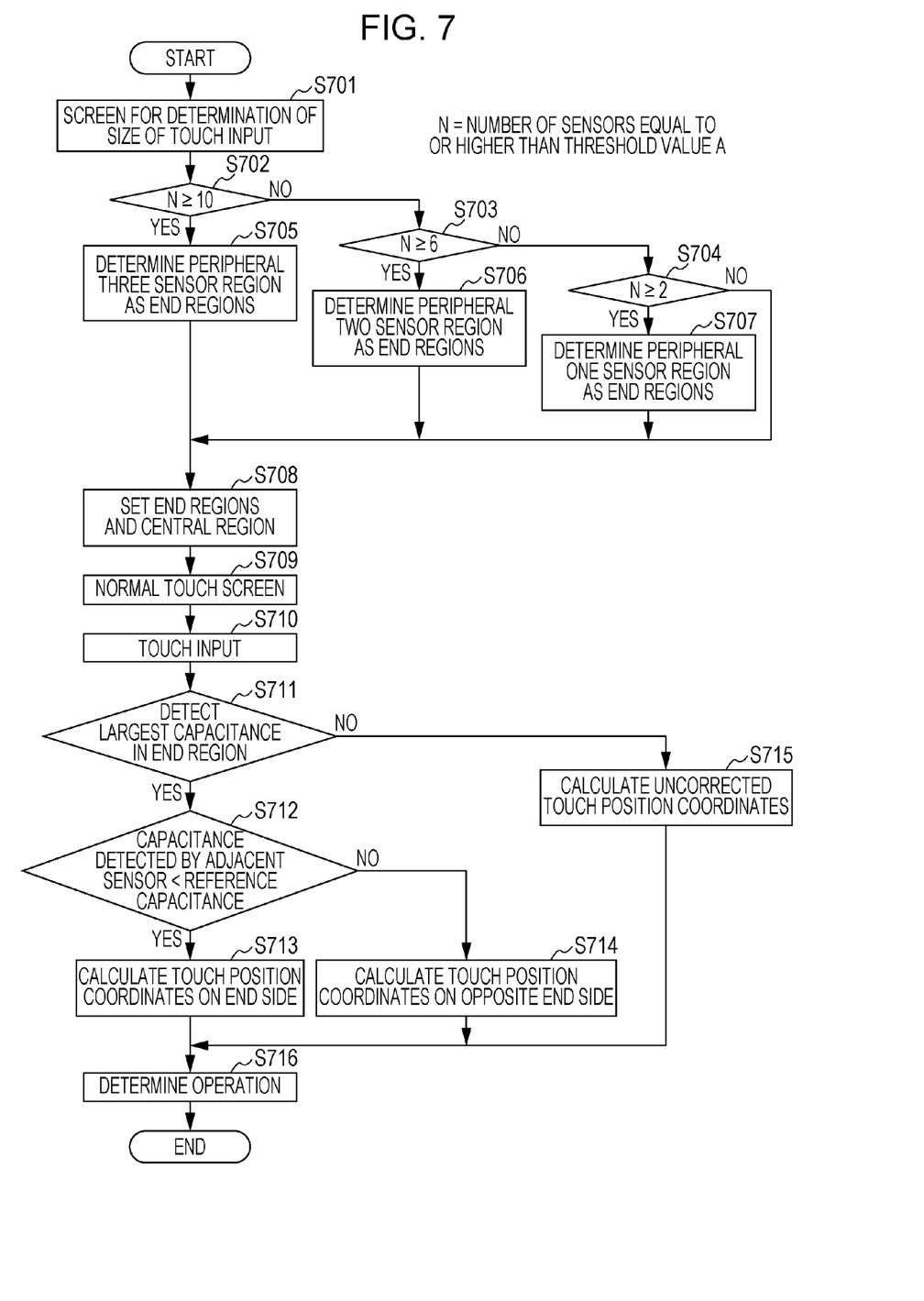
FIG. 7 is a flowchart for calculating touch position coordinates according to the third exemplary embodiment.

FIG. 7 is a flowchart for touch detection control according to the third exemplary embodiment. The processing described in the flowchart illustrated in FIG. 7 may be implemented by decompressing a control program stored in the hard disk 113 into the memory 114 and executing the control program by the CPU 112.

Because the processing steps S710 to S716 in FIG. 7 is the same as the processing in steps S301 to S307 in FIG. 3, the description will be omitted.

In step S701, the CPU 112 displays a touch input determination screen on the display device 117. The processing then moves to step S702.

In steps S702, S703, and S704, the CPU 112 (or the size-of-touch-input determining unit 110) determines the size of a touch input. If the number of sensors having a detected capacitance larger than the determination capacitance 602 is equal to or higher than 10, the CPU 112 proceeds to step S705. If the number of sensors having a detected capacitance larger than the determination capacitance 602 is lower than 10 and equal to or higher than 6, the CPU 112 proceeds to step S706. If the number of sensors having a detected capacitance larger than the determination capacitance 602 is lower than 6 and equal to or higher than 2, the CPU 112 proceeds to step S704. If the number of sensors having a detected capacitance larger than the determination capacitance 602 is lower than 2, the CPU 112 directly proceeds to step S708.

In step S705, the CPU 112 determines the determination end region 605 as the end region 201. The processing then moves to step S708. In step S706, the CPU 112 determines the determination end region 607 as the end region 201. The processing then moves to step S708. In step S707, the CPU 112 determines the determination end region 609 as the end region 201. The processing then moves to step S708.

In step S708, the CPU 112 sets the end region determined in S706 to S707 or a default end region as the end region 201 for calculating touch position coordinates with reference to the reference capacitance 206. The CPU 112 sets the remaining part of the sensor region 200 as the central region 202.

In step S709, the CPU 112 shifts to a screen on which a normal touch is enabled. The processing then moves to step S710. In and after step S710, the CPU 112 executes the same processing as the processing described with reference to steps S301 to S307 in FIG. 3.

As described above, according to the third exemplary embodiment, balanced and even touch positional accuracy can be provided to the entire sensor region of the touch pad while addressing individual differences such as the size of a finger and how to touch. The sensor patterns in FIGS. 6A to 6C are given for illustration purpose only, and the number of sensors in the X direction and the number of sensors in the Y direction are not limited to the examples illustrated in FIGS. 6A to 6C. The reference numbers of sensors for determination of the size of a touch input are not limited to the examples described above. Having described that the determination end regions 605, 607, and 609 are defined based on the numbers of sensors, they may be defined based on position coordinates.

In the aforementioned exemplary embodiments, control to be performed by the CPU 112 may be implemented by one hardware device, or the processing may be divided among a plurality of hardware devices to implement control all over the apparatus.

Having described the present disclosure in detail based on exemplary embodiments, the present disclosure is not limited by those specific exemplary embodiments. Various aspects without departing from the scope and spirit of the present disclosure are also included in the present disclosure. The aforementioned exemplary embodiments are merely exemplary embodiments of the present disclosure, and such exemplary embodiments may be combined as desired.

Having described cases where the present disclosure is applied to an electronic apparatus according to the aforementioned exemplary embodiments, such an electronic apparatus may be any of various apparatus which may be equipped with a display device having a touch panel. For example, embodiments of the present disclosure are also applicable to a personal computer, a mobile information processing apparatus, a tablet terminal, a smart phone, a mobile image viewer, a printing apparatus including a display device, a digital photo frame, a music player, a game machine and an electronic book reader, for example.

Other Exemplary Embodiments

An aspect of the present disclosure may be implemented by processing performed by supplying a program for implementing one or more functionalities of the aforementioned exemplary embodiments to a system or an apparatus over a network or through a storage medium and executing the program by one or more processors in a computer in the system or apparatus. As aspect of the present disclosure may be implemented by a circuit (such as application specific integrated circuit (ASIC)) for implementing such one or more functionalities.

According to aspects of the present disclosure, the accuracy of calculation of touch position coordinates in an end part of a sensor region of a capacitive touch panel can be improved.

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of priority from Japanese Patent Application No. 2015-112814, filed Jun. 3, 2015, which is hereby incorporated by reference herein in its entirety.

What is claimed is:

1. An electronic apparatus comprising:
 a touch panel having a plurality of sensors each having capacitance changing in response to a touch operation performed thereon; and
 a calculating unit configured to, in a case where a detected capacitance of one of a predetermined number of sensors from an outer side of a plurality of sensors exceeds detected capacitance of the other sensors, and a detected capacitance of a sensor adjacent in an inner side direction of the touch panel to the sensor with the detected capacitance exceeding the other sensors is smaller than a reference capacitance, calculate position coordinates of a touch operation generating the detected capacitance toward an outer side direction from a center of gravity of detected capacitances generated by the touch operation from the plurality of sensors.

2. The electronic apparatus according to claim 1, further comprising a control unit configured to control so as to implement a process based on the position coordinates calculated by the calculating unit.

3. The electronic apparatus according to claim 1, wherein, in a case where the detected capacitance from one of sensors arranged on an inner side from the predetermined number of sensors from an outer side therefrom is the highest among the plurality of sensors, the calculating unit calculates the position coordinates of the touch operation generating the detected capacitance to be the center of gravity of detected capacitances generated by the touch operation from the plurality of sensors.

4. The electronic apparatus according to claim 1, wherein, in a case where a detected capacitance of one of the predetermined number of sensors from the outer side of the plurality of sensors is the highest and a detected capacitance of a sensor adjacent in an inner side direction of the touch panel to the sensor detecting the highest detected capacitance is equal to or higher than the reference capacitance, the calculating unit calculates position coordinates of a touch operation generating the detected capacitance toward an inner side direction from the center of gravity of detected capacitances generated by the touch operation from the plurality of sensors.

5. The electronic apparatus according to claim 1, wherein, in a case where a detected capacitance of one being a first sensor of a predetermined number of sensors from an outer side of a plurality of sensors is the highest and a detected capacitance of a second sensor adjacent in an inner side direction of the touch panel to the sensor detecting the highest detected capacitance is smaller than the reference capacitance, a virtual sensor is set on outer side of the touch panel from the first sensor, a virtual capacitance of the virtual sensor is determined from the detected capacitance from the second sensor and the reference capacitance, and the position coordinates are calculated by using the detected capacitance from the first sensor, the detected capacitance from the second sensor, and the virtual capacitance.

6. The electronic apparatus according to claim 1, wherein the predetermined number is equal to one.

7. The electronic apparatus according to claim 1, further comprising a determining unit configured to determine a size of a touch area of the touch panel of the touch operation performed thereon, and a setting unit configured to set the predetermined number to a number based on the size of the touch area determined by the determining unit.

8. The electronic apparatus according to claim 1, wherein the plurality of sensors is arranged two-dimensionally.

9. A control method for an electronic apparatus including a touch panel having a plurality of sensors each having capacitance changing in response to a touch operation performed thereon, the method comprising:
in a case where a detected capacitance of one of a predetermined number of sensors from an outer side of a plurality of sensors exceeds detected capacitance of the other sensors, and a detected capacitance of a sensor adjacent in an inner side direction of the touch panel to the sensor with the detected capacitance exceeding the other sensors is smaller than a reference capacitance, calculating position coordinates of a touch operation generating the detected capacitance toward an outer side direction from a center of gravity of detected capacitances generated by the touch operation from the plurality of sensors.

10. A non-transitory computer-readable storage medium storing a program for causing a computer to implement a control method for an electronic apparatus including a touch panel having a plurality of sensors each having capacitance changing in response to a touch pattern performed thereon, the control method comprising:
in a case where a detected capacitance of one of a predetermined number of sensors from an outer side of a plurality of sensors exceeds detected capacitance of the other sensors and a detected capacitance of a sensor adjacent in an inner side direction of the touch panel to the sensor with the detected capacitance exceeding the other sensors is smaller than a reference capacitance, calculating position coordinates of a touch operation toward an outer side direction from a center of gravity of detected capacitances generated by the touch operation from the plurality of sensors caused by the touch operation.

* * * * *